United States Patent
Akasaka

(10) Patent No.: US 7,039,283 B2
(45) Date of Patent: May 2, 2006

(54) OPTICAL AMPLIFICATION PRODUCING WIDER TOTAL GAIN BANDWIDTH

(75) Inventor: Youichi Akasaka, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 8 days.

(21) Appl. No.: 10/826,125

(22) Filed: Apr. 16, 2004

(65) Prior Publication Data

US 2005/0232559 A1    Oct. 20, 2005

(51) Int. Cl.
*G02B 6/00*    (2006.01)
(52) U.S. Cl. .................................. 385/123; 385/142
(58) Field of Classification Search ........ 385/123–128, 385/141, 142, 144
See application file for complete search history.

(56) References Cited

U.S. PATENT DOCUMENTS

| 6,717,963 | B1 |   | 4/2004 | Foursa |
| 6,748,136 | B1 | * | 6/2004 | Headley et al. ............... 385/27 |
| 2003/0181307 | A1 | * | 9/2003 | Myers et al. .................. 501/45 |

OTHER PUBLICATIONS

Yoshihiro Emori and Shu Namiki, "100nm Bandwidth Flat Gain Raman Amplifiers Pumped and Gain-Equalized by 12-Wavelength-Channel WDM High Power Laser Diodes," OFC 1999, PD 19-1-PD 19-3.

Y. Akasaka, S. Kado, K. Aiso, T. Yagi, T. Suzuki, H. Koaizawa and T. Kamiya, "Phospate-Doped Transmission Fiber with Over 40THz Raman-Gain Bandwidth," ECOC 2001, MO.B.3.2n.

T. Tsuzaki, M. Kakui, M. Hirano, M. Onishi, Y. Nakai and M. Nishimura, "Broadband Discrete Fiber Raman Amplifier with High Differential Gain Operating Over 1.65 μm-Band," OFC 2001, MA 3-1-MA 3-3.

D. Vakshoori, M. Azimi, P. Chen, B. Han, M. Jiang, K.J. Knopp, C.C. Lu, Y. Shen, G. Vander Rhodes, S. Vote, P.D. Wang, X. Zhu, "Raman Amplification Using High-Power Incoherent Semiconductor Pump Sources," OFC 2003, PD 47-1-PD 47-3.

Y. Akasaka, S. Kado, K. Aiso, T. Yagi, T. Suzuki, H. Koaizawa, and T. Kamiya; Phosphate-doped transmission fiber with over 40THz Raman-gain bandwidth; Proc. 27th Eur. Conf. on Opt. Comm. (ECOC'01—Amsterdam); Sep. 30, 2001; pp. 76 and 77; vol. 1.

* cited by examiner

*Primary Examiner*—Sarah Song

(57) ABSTRACT

A communication system and method are disclosed to provide a wider gain bandwidth. One embodiment of the invention is a communication system comprising a transmitter, a Phosphate-doped fiber span, a receiver, and a continuous wavelength light system. When in operation, the transmitter transmits optical signals over the Phosphate-doped fiber span for receipt by the receiver. Concurrently, the continuous wavelength light system pumps continuous wavelength light onto the Phosphate-doped fiber span. The pumping by the continuous wavelength light system generates a total gain bandwidth of at least 120 nm.

26 Claims, 4 Drawing Sheets

OPTICAL AMPLIFICATION PRODUCING WIDER TOTAL GAIN BANDWIDTH

BACKGROUND OF THE INVENTION

1. Field of the Invention

The invention is related to the field of communication systems, and in particular, to optical amplification producing a wider total gain bandwidth.

2. Statement of the Problem

Many communication companies use fiber optic cabling as a media for transmitting data because of its high-bandwidth capacity. Fiber optic cables can reliably transport optical signals over long distances. However, over a long distance, the optical signals attenuate in the optical fiber due to Rayleigh scattering. The attenuation may be recovered using optical amplifiers, such as discrete amplifiers or distributed amplifiers. Distributed amplifiers use the transmission fiber carrying the optical signals as a gain medium. Discrete amplifiers do not use the transmission fiber as a gain medium, but use another type of fiber or component as the gain medium.

One type of transmission fiber currently used in fiber optic networks is a silicate-based optical fiber. The low attenuation region of a silicate-based optical fiber that can be used for data transmission is about 300 nm (1300 nm to 1600 nm). Unfortunately, the low attenuation region may not be fully utilized for data transmission because current optical amplifiers can only recover optical signals within a narrow gain band.

Many discrete amplifiers provide a gain bandwidth of 30 nm or less. For instance, a C-band EDFA provides about a 30 nm gain bandwidth in the C-band (about 1530 nm to 1560 nm). To achieve a wider gain bandwidth, multiple discrete amplifiers may be used simultaneously. For instance, the C-band EDFA may be used to amplify wavelengths in the C-band simultaneously as another EDFA amplifies wavelengths in the L-band (about 1565 nm to 1620 nm). Simultaneous use of these two amplifiers can provide a gain bandwidth of over 80 nm. A Fluoride-based Thulium-doped fiber amplifier (F-TDFA) may be used to amplify wavelengths in the S-band (about 1460 nm to 1530 nm). Simultaneous use of these three amplifiers can provide a gain bandwidth of over 100 nm. Unfortunately, simultaneous use of these amplifiers can be complex and expensive.

Raman amplification may also be used to get wider gain bandwidths. If a Raman fiber laser pumps a Germanium-doped Silicate fiber at a given wavelength, the pumping may generate a 3 dB gain bandwidth of about 30 nm. To obtain wider gain bandwidths, Wavelength Division Multiplexing (WDM) pumping may be used to pump the optical fiber at multiple wavelengths. The WDM pumping can provide multiple 3 dB gain bands having a bandwidth of about 30 nm, where each gain band corresponds to each wavelength being pumped. However, the total gain bandwidth is limited to less than 100 nm. In Raman amplification, the gain band is at a 100 nm longer wavelength region than the pumping wavelength. The longest wavelengths being pumped can overlap the gain band that corresponds with the shortest wavelength being pumped. Because there is a 100 nm gap between the pumping wavelength and the gain band in Raman amplification, the total gain bandwidth for WDM pumping is limited to less than about 100 nm.

To overcome this limitation, other materials may be used in the optical fiber. If a Raman fiber laser pumps a Phosphate-doped Silicate fiber or Phosphate-Germanium co-doped Silicate fiber at a given wavelength, the pumping generates a gain band at the same 100 nm longer wavelength region as in a Germanium-doped fiber. The gain band at the 100 nm longer wavelength region has a bandwidth of about 30 nm (3 dB). The pumping of the Phosphate-doped fiber or Phosphate-Germanium co-doped Silicate fiber also generates a second gain band at a 250 nm longer wavelength region. Unfortunately, the gain band in the 250 nm longer wavelength region only has a bandwidth of about 9 nm (3 dB). The narrow 9 nm gain bandwidth in the 250 nm longer wavelength region limits the advantages of WDM pumping, as WDM pumping of the Phosphate-doped fiber generates a non-continuous gain bandwidth in the 250 nm longer wavelength region.

SUMMARY OF THE SOLUTION

The invention helps solve the above and other problems by pumping a Phosphate-doped fiber with a continuous wavelength light system (i.e., continuous wavelength laser) to generate a total gain bandwidth of at least 120 nm. Advantageously, the invention may provide a wider total gain bandwidth than the prior art in a less complex and a more cost effective manner. As an example, a continuous wavelength light system may be cheaper and easier to operate as compared to a WDM pumping system used in the prior art. The wider gain bandwidth allows optical communication systems to utilize more wavelengths for data transmission.

One embodiment of the invention is a communication system comprising a transmitter, a fiber span, a receiver, and a continuous wavelength light system. The fiber span comprises a Phosphate-doped fiber. When in operation, the transmitter transmits optical signals over the Phosphate-doped fiber span for receipt by the receiver. Concurrently, the continuous wavelength light system pumps continuous light onto the Phosphate-doped fiber span. The pumping by the continuous wavelength light system generates a total gain bandwidth of at least 120 nm.

For instance, the pumping by the continuous wavelength light system generates a first gain band and a second gain band. A wavelength in the first gain band corresponds to a wavelength pumped by the continuous wavelength light system by being about 100 nm longer than the wavelength being pumped by the continuous wavelength light system. A wavelength in the second gain band corresponds to a wavelength pumped by the continuous wavelength light system by being about 250 nm longer than the wavelength being pumped by the continuous wavelength light system. The first gain band and the second gain band may each have a bandwidth in the range of about 60 nm to 100 nm to produce a total gain bandwidth of at least 120 nm. The gain represented in each of the first gain band and the second gain band is substantially continuous.

The invention may include other embodiments provided below.

DESCRIPTION OF THE DRAWINGS

The same reference number represents the same element on all drawings.

DETAILED DESCRIPTION OF THE INVENTION

Prior Art—FIGS. 1–5

Figure 1:
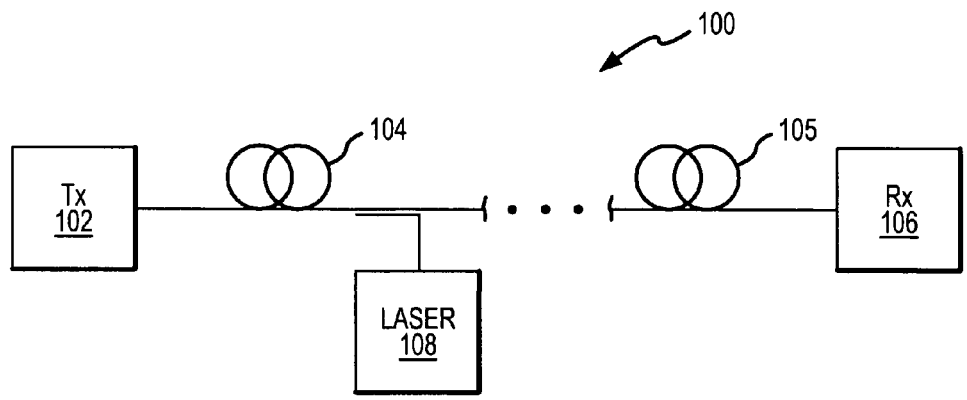
FIG. 1 illustrates a communication system in the prior art.

FIG. 1 illustrates a communication system 100 in the prior art to help better understand the invention. Communication system 100 is comprised of a transmitter 102, fiber spans 104–105, a receiver 106, and a laser 108. Transmitter 102 is coupled to receiver 106 by fiber spans 104–105. Laser 108 comprises a laser diode set to pump at a particular wavelength. Fiber spans 104–105 are Germanium-doped Silicate fibers.

In operation, transmitter 102 transmits optical signals over fiber spans 104–105 for receipt by receiver 106. The optical signals may attenuate in the fiber spans 104–105. To compensate for the attenuation, laser 108 pumps fiber span 104 at a particular wavelength.

Figure 2:
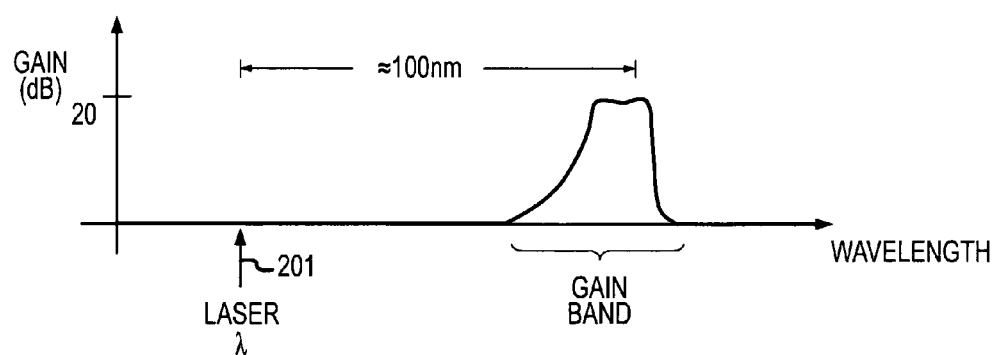
FIG. 2 is a spectral diagram illustrating the gain generated in a fiber span in FIG. 1 in the prior art.

FIG. 2 is a spectral diagram illustrating the gain generated in fiber span 104 due to the pumping by laser 108. Arrow 201 illustrates the wavelength pumped by laser 108. Due to Raman amplification, the pumping by laser 108 generates a gain band at about a 100 nm longer wavelength region than the pumping wavelength. Unfortunately, the gain bandwidth is only about 30 nm. A wider gain bandwidth may be desired.

Figure 3:
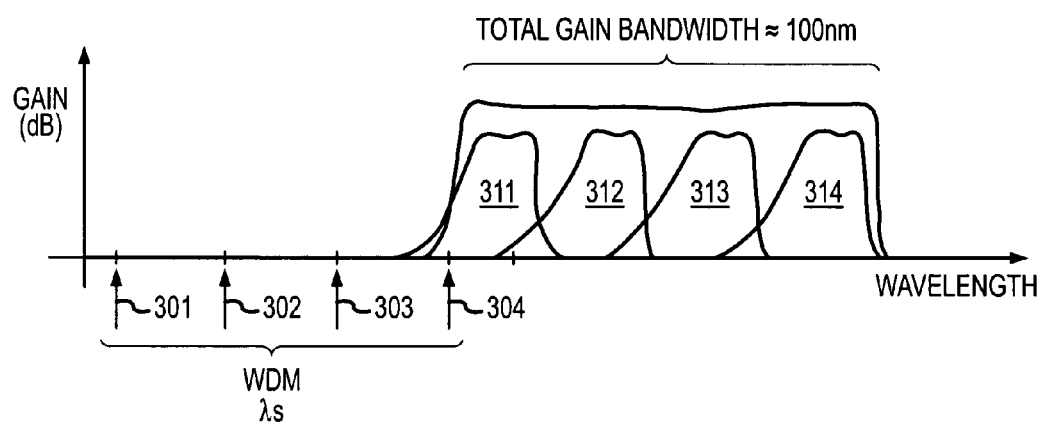
FIG. 3 is a spectral diagram illustrating the gain generated by WDM pumping a fiber span in the prior art.

To obtain wider gain bandwidths, Wavelength Division Multiplexing (WDM) pumping may be used to pump fiber span 104 at multiple wavelengths. In FIG. 1, assume that laser 108 comprises a WDM pumping system configured to pump at multiple wavelengths. FIG. 3 is a spectral diagram illustrating the gain generated in fiber span 104 due to WDM pumping. Arrows 301–304 illustrate the wavelengths of light pumped by laser 108. Due to Raman amplification, the pumping by laser 108 generates gain bands 311–314 at about a 100 nm longer wavelength region than each pumping wavelength. For instance, gain bands 311–314 correspond to pumping wavelengths 301–304, respectively. Gain bands 311–314 together form a total gain band of about 100 nm. However, the total gain bandwidth is limited to 100 nm or less. The longest wavelength being pumped (shown as arrow 304) can overlap the gain band 311 that corresponds with the shortest wavelength being pumped (shown as arrow 301). Thus, the gain bandwidth generated by WDM pumping may be limited to about 100 nm.

Figure 4:
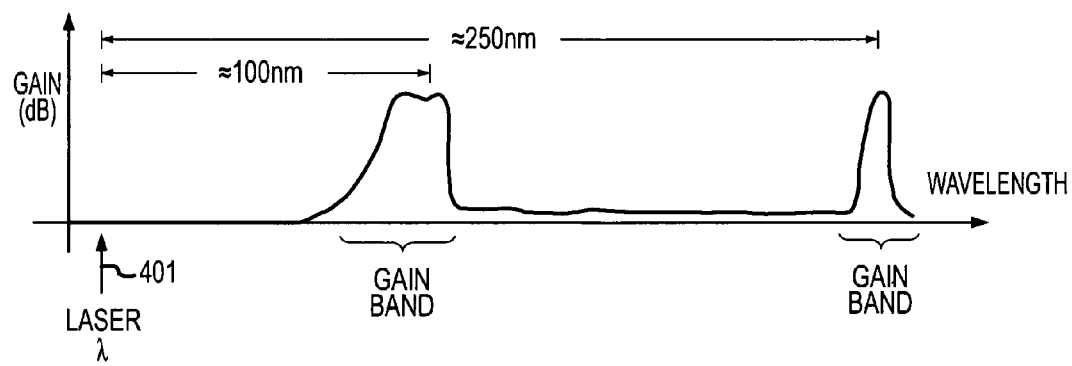
FIG. 4 is a spectral diagram illustrating the gain generated by pumping a Phosphate-doped fiber span in the prior art.

To overcome this limitation, other materials may be used in fiber spans 104–105 of FIG. 1. Pumping a Phosphate-doped Silicate fiber generates a different gain spectrum than pumping a Germanium-doped fiber. Assume that laser 108 again pumps fiber span 104 at a single wavelength. FIG. 4 is a spectral diagram illustrating the gain generated in fiber span 104 that is Phosphate-doped. Arrow 401 illustrates the wavelength pumped by laser 108. Due to Raman amplification, the pumping by laser 108 generates a gain band at about a 100 nm longer wavelength region than the pumping wavelength. The pumping by laser 108 also generates a gain band at about a 250 nm longer wavelength region than the pumping wavelength. The gain bandwidth at the 100 nm longer wavelength region is about 30 nm. The gain bandwidth in the 250 nm longer wavelength region is only about 9 nm.

Figure 5:
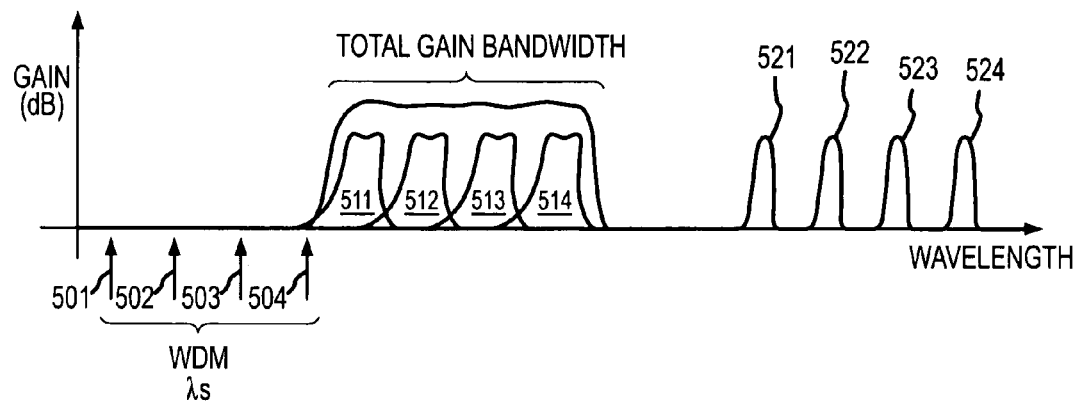
FIG. 5 is a spectral diagram illustrating the gain generated by WDM pumping a Phosphate-doped fiber span in the prior art.

To again obtain wider gain bandwidths, WDM pumping may be used to pump the Phosphate-doped fiber span 104 at multiple wavelengths. FIG. 5 is a spectral diagram illustrating the gain generated by WDM pumping fiber span 104 that is Phosphate-doped. Arrows 501–504 illustrate the wavelengths pumped by laser 108. The pumping by laser 108 generates gain bands 511–514 at about a 100 nm longer wavelength region than each pumping wavelength, and generates gain bands 521–524 at about a 250 nm longer wavelength region than each pumping wavelength. Gain bands 511–514 together form a total gain bandwidth of about 100 nm. Unfortunately, the narrow 9 nm gain bandwidth of gain bands 521–524 in the 250 nm longer wavelength region limits the advantages of WDM pumping. WDM pumping of the Phosphate-doped fiber span 104 (see FIG. 1) generates non-continuous gain bands 521–524 in the 250 nm longer wavelength region. The non-continuous gain bands 521–524 in the 250 nm longer wavelength region may not effectively amplify the wavelengths in the 250 nm longer wavelength region. Thus, the total gain bandwidth is still limited. A wider gain bandwidth may be desired.

Figure 6:
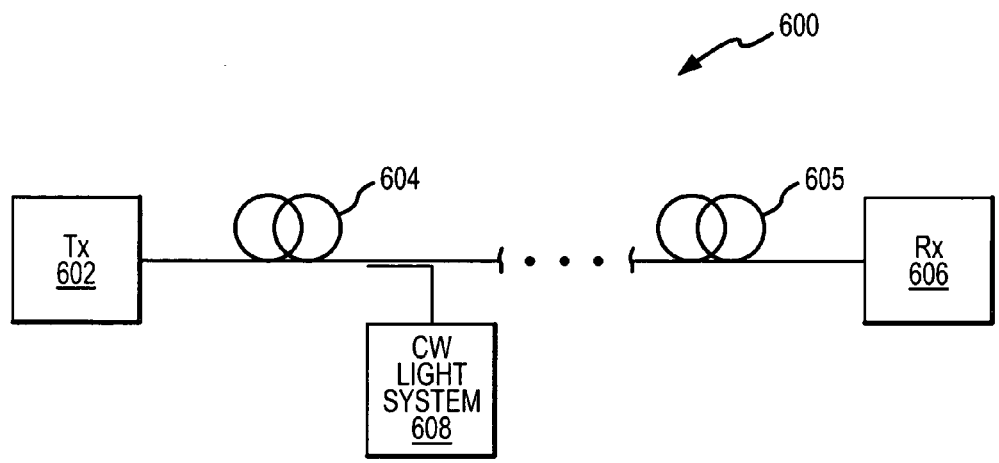
FIG. 6 illustrates a communication system in an embodiment of the invention.
Figure 7:
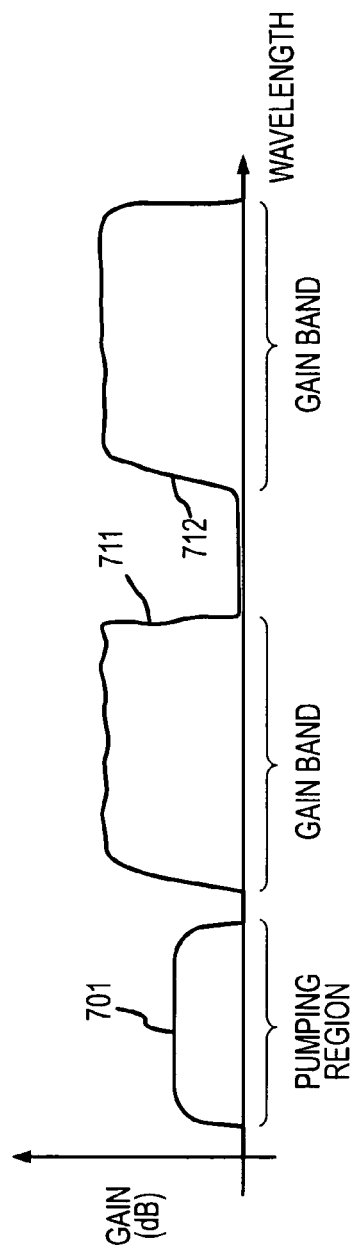
FIG. 7 is a spectral diagram illustrating the gain generated by pumping a Phosphate-doped fiber span in FIG. 6 with a continuous wavelength light system in an embodiment of the invention.
Figure 8:
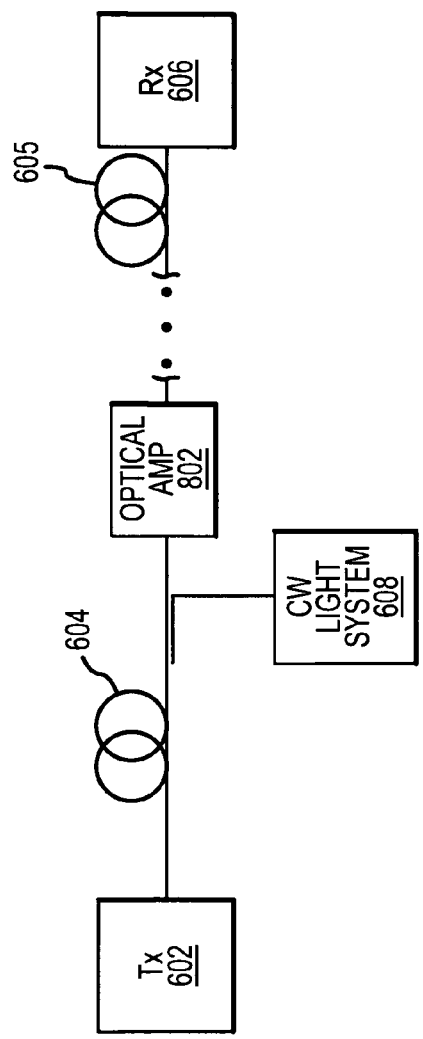
FIG. 8 illustrates the communication system of FIG. 6 that further includes an optical amplifier in an embodiment of the invention.

Description of the Invention—FIGS. 6–8

FIGS. 6–8 and the following description depict specific embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

FIG. 6 illustrates a communication system 600 in an embodiment of the invention. Communication system 600 is comprised of a transmitter 602, fiber spans 604–605, a receiver 606, and a continuous wavelength light system 608. Transmitter 602 is coupled to receiver 606 by fiber spans 604–605. Examples of continuous wavelength light system 608 comprise a continuous-wave Raman fiber laser and a continuous-wave laser diode. Fiber span 604 comprises a Phosphate-doped fiber or a Phosphate-Germanium co-doped fiber. In other embodiments, fiber span 604 may be comprised of any material that provides substantially the same gain characteristics as a Phosphate-doped fiber, such as Tellurite fibers. Communication system 600 may include other systems, devices, or components not shown for the sake of brevity. In this embodiment, the combination of fiber span 604 and continuous wavelength light system 608 is illustrated as a distributed amplifier. In other embodiments, the combination of fiber span 604 and continuous wavelength light system 608 may comprise a discrete amplifier.

In operation, transmitter 602 transmits optical signals over fiber spans 604–605 for receipt by receiver 606. The optical signals may attenuate in the fiber spans 604–605. To compensate for the attenuation or otherwise recover the optical signals, continuous wavelength light system 608 pumps continuous wavelength light onto Phosphate-doped fiber span 604. Continuous wavelength light system 608 may be set to a power of about 100 mW. Continuous wavelength light system 608 may forward or backward pump the continuous wavelength light onto Phosphate-doped fiber span 604. In some embodiments, continuous wavelength light system 608 may simultaneously backward pump and forward pump fiber span 604.

FIG. 7 is a spectral diagram illustrating the gain generated by pumping the Phosphate-doped fiber span 104 with continuous wavelength light system 608. Pumping region 701 illustrates the continuous wavelength light pumped by continuous wavelength light system 608. The pumping by continuous wavelength light system 608 generates a gain band 711. A wavelength in gain band 711 corresponds to a wavelength in the pumping region 701 by being about 100 nm longer than the wavelength in the pumping region 701. The pumping by continuous wavelength light system 608 also generates another gain band 712. A wavelength in gain band 712 corresponds to a wavelength in the pumping region 701 by being about 250 nm longer than the wavelength in the pumping region 701. Gain band 711 may have a gain bandwidth in the range of about 60 nm to 100 nm. Similarly, gain band 712 may have a gain bandwidth in the range of about 60 nm to 100 nm.

Gain bands 711–712 may include wavelengths in the C-band, the L-band, the S-band, and/or other desired bands. Due to the properties of Raman amplification, the wavelengths included in gain bands 711–712 depend on the wavelengths selected for continuous wavelength light system 608. For instance, gain band 711 may be from about 1430 nm to about 1530 nm and gain band 712 may be from about 1600 nm to about 1700 nm.

Together, gain bands 711–712 may advantageously form a total gain bandwidth of at least 120 nm (3 dB). For instance, the total gain bandwidth may be about 120 nm, 130 nm, 140 nm, etc, up to or exceeding about 200 nm. When compared to the prior art systems that could only generate a gain bandwidth of about 100 nm, communication system 600 can advantageously provide a wider gain bandwidth. When implemented according to the invention, communication system 600 may be cheaper to build and operate than systems that provide a more narrow gain bandwidth.

In FIG. 7, there is a wavelength gap between gain band 711 and 712. To amplify the wavelengths in the wavelength gap between gain band 711 and 712, other optical amplification techniques may be used.

The following describes some different embodiments of continuous wavelength light system 608. One embodiment is an output of a Semiconductor Optical Amplifier (SOA). An SOA is an amplifier that amplifies input signals with exited state energy of laser substrate stimulated by input signals. In case of no signal inputs, there is spontaneous emission all over its gain bandwidth. This emission, called noise, is continuous light over a wavelength and could be used for Raman pump sources if its power is large enough.

Another embodiment is an amplified amplifier's ASE. Amplifiers, such as an EDFA, generate spontaneous emission as noise over its gain bandwidth. By inputting this noise to the contributed amplifier (same type of amplifier), the generated noise would be amplified. As a result, the continuous wavelength noise source would have higher optical power than its original power. If the output power is large enough for Raman amplification, it could be used as Raman pump sources.

Another embodiment is an amplifier's ASE including an SOA. If an SOA's gain bandwidth is same as other amplifiers, other amplifiers could amplify the SOA's spontaneous emission and it could be used for Raman pump sources. The SOA could amplify other amplifier's spontaneous emission and it could be used for Raman pump sources.

FIG. 8 illustrates communication system 600 that further includes an optical amplifier to amplify the wavelengths in the wavelength gap. Communication system 600 is comprised of a transmitter 602, fiber spans 604–605, receiver 606, continuous wavelength light system 608, and optical amplifier 802. Optical amplifier 802 may comprise a semiconductor optical amplifier, an EDFA or another fiber amplifier using a different dopant, a discrete Raman amplifier, or any other amplifier configured to amplify the desired wavelengths.

In operation, continuous wavelength light system 608 pumps continuous wavelength light onto Phosphate-doped fiber span 604 to generate the gain illustrated in FIG. 7. At the same time, optical amplifier 802 amplifies the wavelengths between gain band 711 and gain band 712 to generate a wider continuous gain band in the manner of cascaded or parallel amplification. The total gain bandwidth may advantageously exceed 200 nm.

In summary, the invention provides a wider total gain bandwidth as compared to the prior art. Advantageously, more optical signal wavelengths may be used to carry data, which may be important as the capacity demands of long haul optical communication systems increase.

What is claimed is:

1. A communication system, comprising:
   a span of Phosphate-doped optical fiber configured to transport optical signals; and
   a continuous wavelength light system coupled to the span of Phosphate-doped optical fiber and configured to pump continuous wavelength light onto the span of Phosphate-doped optical fiber to generate a total gain bandwidth of at least 120 nm.

2. The communication system of claim 1 wherein the span of Phosphate-doped optical fiber comprises a span of Phosphate-Germanium co-doped optical fiber.

3. The communication system of claim 1 wherein the continuous wavelength light system is configured to pump continuous wavelength light onto the span of Phosphate-doped optical fiber to generate a first gain band having a bandwidth of at least 60 nm and a second gain band having a bandwidth of at least 60 nm.

4. The communication system of claim 3 wherein the first gain band and the second gain band are separated by a wavelength gap, and wherein the communication system further comprises:
   an optical amplifier configured to amplify the wavelengths in the wavelength gap.

5. The communication system of claim 1 wherein the continuous wavelength light system is configured to pump the continuous wavelength light onto the span of Phosphate-doped optical fiber to generate a total gain bandwidth of about 200 nm.

6. The communication system of claim 1 wherein the continuous wavelength light system is configured to forward pump the continuous wavelength light onto the span of Phosphate-doped optical fiber.

7. The communication system of claim 1 wherein the continuous wavelength light system is configured to backward pump the continuous wavelength light onto the span of Phosphate-doped optical fiber.

8. The communication system of claim 1 wherein the continuous wavelength light system is configured to forward pump and backward pump the continuous wavelength light onto the span of Phosphate-doped optical fiber.

9. The communication system of claim 1 wherein the continuous wavelength light system comprises a continuous wavelength Raman fiber laser.

10. The communication system of claim 1 wherein the continuous wavelength light system is configured to pump the continuous wavelength light onto the span of Phosphate-doped optical fiber to generate a total gain bandwidth of at least 120 nm that includes at least the C-band.

11. The communication system of claim 1 wherein the continuous wavelength light system is configured to pump the continuous wavelength light onto the span of Phosphate-doped optical fiber to generate a total gain bandwidth of at least 120 nm that includes at least the C-band and the L-band.

12. The communication system of claim 1 wherein the continuous wavelength light system is configured to pump the continuous wavelength light onto the span of Phosphate-doped optical fiber to generate a total gain bandwidth of at least 120 nm that includes at least the C-band, the L-band, and the S-band.

13. The communication system of claim 1 wherein the continuous wavelength light system is configured to pump the continuous wavelength light onto the span of Phosphate-doped optical fiber to generate a total gain bandwidth of at least 120 nm that does not include at least one of the C-band, the L-band, and the S-band.

14. A method of operating a communication system comprising a continuous wavelength light system and a span of Phosphate-doped optical fiber, the method comprising the steps of:
    transporting optical signals on the span of Phosphate-doped optical fiber; and
    pumping continuous wavelength light on the span of Phosphate-doped optical fiber with a continuous wavelength light system to generate a total gain bandwidth of at least 120 nm.

15. The method of claim 14 wherein the span of Phosphate-doped optical fiber comprises a span of Phosphate-Germanium co-doped optical fiber.

16. The method of claim 14 wherein the step of pumping continuous wavelength light on the span of Phosphate-doped optical fiber with a continuous wavelength light system comprises:
    pumping the continuous wavelength light onto the span of Phosphate-doped optical fiber to generate a first gain band having a bandwidth of at least 60 nm and a second gain band having a bandwidth of at least 60 nm.

17. The method of claim 16 wherein the first gain band and the second gain band are separated by a wavelength gap, and the method further comprises:
    amplifying the wavelengths in the wavelength gap with an optical amplifier.

18. The method of claim 14 wherein the step of pumping continuous wavelength light on the span of Phosphate-doped optical fiber with a continuous wavelength light system to generate a total gain bandwidth of at least 120 nm comprises:
    pumping the continuous wavelength light on the span of Phosphate-doped optical fiber with the continuous wavelength light system to generate a total gain bandwidth of about 200 nm.

19. The method of claim 14 wherein the step of pumping continuous wavelength light on the span of Phosphate-doped optical fiber comprises:
    forward pumping the continuous wavelength light on the span of Phosphate-doped optical fiber.

20. The method of claim 14 wherein the step of pumping continuous wavelength light on the span of Phosphate-doped optical fiber comprises:
    backward pumping the continuous wavelength light on the span of Phosphate-doped optical fiber.

21. The method of claim 14 wherein the step of pumping continuous wavelength light on the span of Phosphate-doped optical fiber comprises:
    backward and forward pumping the continuous wavelength light on the span of Phosphate-doped optical fiber.

22. The method of claim 14 wherein the continuous wavelength light system comprises a continuous wavelength Raman fiber laser.

23. The method of claim 14 wherein the step of pumping continuous wavelength light on the span of Phosphate-doped optical fiber with a continuous wavelength light system comprises:
    pumping the continuous wavelength light on the span of Phosphate-doped optical fiber with the continuous wavelength light system to generate the total gain bandwidth in at least the C-band.

24. The method of claim 14 wherein the step of pumping continuous wavelength light on the span of Phosphate-doped optical fiber with a continuous wavelength light system comprises:
    pumping the continuous wavelength light on the span of Phosphate-doped optical fiber with the continuous wavelength light system to generate the total gain bandwidth in at least the C-band and the L-band.

25. The method of claim 14 wherein the step of pumping continuous wavelength light on the span of Phosphate-doped optical fiber with a continuous wavelength light system comprises:
    pumping the continuous wavelength light on the span of Phosphate-doped optical fiber with the continuous wavelength light system to generate the total gain bandwidth in at least the C-band, the L-band, and the S-band.

26. The method of claim 14 wherein the step of pumping continuous wavelength light on the span of Phosphate-doped optical fiber with a continuous wavelength light system comprises:
    pumping the continuous wavelength light on the span of Phosphate-doped optical fiber with the continuous wavelength light system to generate the total gain bandwidth outside of at least one of the C-band, the L-band, and the S-band.

* * * * *